United States Patent
Sexton et al.

[11] Patent Number: 6,082,963
[45] Date of Patent: Jul. 4, 2000

[54] REMOVABLE INNER TURBINE SHELL WITH BUCKET TIP CLEARANCE CONTROL

[75] Inventors: Brendan F. Sexton, Clifton Park; Hans M. Knuijt, Niskayuna; Sacheverel Q. Eldrid, Saratoga Springs; Albert Myers, Amsterdam; Kyle E. Coneybeer, Schenectady; David Martin Johnson, Ballston Lake; Iain R. Kellock, Clifton Park, all of N.Y.

[73] Assignee: General Electric Co., Schenectady, N.Y.

[21] Appl. No.: 09/249,047

[22] Filed: Feb. 12, 1999

Related U.S. Application Data

[62] Division of application No. 08/857,749, May 16, 1997, Pat. No. 5,913,658, which is a division of application No. 08/414,698, Mar. 31, 1995, Pat. No. 5,685,693.

[51] Int. Cl.⁷ .................................................. F04D 29/38
[52] U.S. Cl. .......................................... 415/115; 415/116
[58] Field of Search ...................................... 415/115, 116

[56] References Cited

U.S. PATENT DOCUMENTS

| | | |
|---|---|---|
| 2,994,472 | 8/1961 | Botje . |
| 3,250,512 | 5/1966 | Petrie . |
| 3,408,044 | 10/1968 | Burger . |
| 3,493,212 | 2/1970 | Scalzo et al. . |
| 3,628,884 | 12/1971 | Mierley . |
| 3,997,280 | 12/1976 | Germain . |
| 4,014,627 | 3/1977 | Heurteux . |
| 4,023,731 | 5/1977 | Patterson . |
| 4,153,387 | 5/1979 | Weiler . |
| 4,230,436 | 10/1980 | Davison . |
| 4,304,093 | 12/1981 | Schuize . |
| 4,329,114 | 5/1982 | Johnston et al. . |
| 4,363,599 | 12/1982 | Cline et al. . |
| 4,386,885 | 6/1983 | Beckershoff . |
| 4,842,477 | 6/1989 | Stowell . |
| 4,893,983 | 1/1990 | McGreehan . |
| 4,893,984 | 1/1990 | Davison et al. . |
| 4,928,240 | 5/1990 | Davison et al. . |
| 5,012,420 | 4/1991 | Walker et al. . |
| 5,018,942 | 5/1991 | Ciokajlo et al. . |
| 5,049,033 | 9/1991 | Corsmeier et al. . |
| 5,054,997 | 10/1991 | Corsmeier et al. . |
| 5,056,988 | 10/1991 | Corsmeier et al. . |
| 5,104,287 | 4/1992 | Ciokajlo . |
| 5,116,199 | 5/1992 | Ciokajlo . |
| 5,127,793 | 7/1992 | Walker et al. . |
| 5,131,811 | 7/1992 | Johnson . |
| 5,154,578 | 10/1992 | Miraucourt et al. . |
| 5,167,488 | 12/1992 | Ciokajlo et al. . |
| 5,205,115 | 4/1993 | Plemmons et al. . |
| 5,212,940 | 5/1993 | Glover . |
| 5,219,268 | 6/1993 | Johnson . |
| 5,228,828 | 7/1993 | Damlis et al. . |
| 5,281,085 | 1/1994 | Lenahan et al. . |
| 5,281,090 | 1/1994 | Starling . |
| 5,333,993 | 8/1994 | Stueber et al. . |
| 5,779,442 | 7/1998 | Sexton et al. . |

FOREIGN PATENT DOCUMENTS

| | | |
|---|---|---|
| 0 040 267 | 11/1981 | European Pat. Off. . |
| 0 424 253 | 4/1991 | European Pat. Off. . |
| 1930959 | 1/1970 | Germany . |
| 3509359 | 8/1986 | Germany . |
| 618635 | 4/1949 | United Kingdom . |
| 826087 | 12/1959 | United Kingdom . |
| 1020900 | 2/1966 | United Kingdom . |
| 2 060 077 | 4/1981 | United Kingdom . |

*Primary Examiner*—John Kwon
*Attorney, Agent, or Firm*—Nixon & Vanderhye

[57] ABSTRACT

A turbine includes a plurality of inner shell sections mounting first and second stage nozzle and shroud portions. The inner shell sections are pinned to an outer containment shell formed of sections to preclude circumferential movement of the inner shell relative to the outer shell and enable thermal expansion and contraction of the inner shell relative to the outer shell. Positive bucket tip clearance control is afforded by passing a thermal medium about the inner shell in heat transfer relation with the shrouds about the first and second stage bucket tips, the thermal medium being provided from a source of heating/cooling fluid independent of the turbine. Access is provided to the rotor and turbine buckets by removing the outer and inner shell sections.

12 Claims, 12 Drawing Sheets

REMOVABLE INNER TURBINE SHELL WITH BUCKET TIP CLEARANCE CONTROL

This application is a division of application Ser. No. 08/857,749, filed May 16, 1997, now U.S. Pat. No. 5,913,658, issued Jun. 22, 1999, which in turn is a division of application Ser. No. 414,698, filed Mar. 31, 1995, now U.S. Pat. No. 5,685,693, issued Nov. 11, 1997.

This invention was made with Government support under Contract No. DE-FC21-95MC311876 awarded by the Department of Energy. The Government has certain rights in this invention.

TECHNICAL FIELD

The present invention relates generally to turbines, and particularly to land-based gas turbines employing either closed-cycle steam or air cooling or open-cycle air cooling of hot gas path components and having removable inner and outer turbine shells affording access to the high maintenance hot gas path parts of the turbine without removal of the rotor for maintenance, repair and/or conversion between air and steam cooling. The present invention also relates to inner and outer turbine shells constructed to afford positive bucket tip clearance control.

BACKGROUND

Hot gas path components in gas turbines typically employ air convection and air film techniques for cooling surfaces exposed to high temperatures. High pressure air is conventionally bled from the compressor and the energy of compressing the air is lost after the air is used for cooling. In current heavy duty gas turbines for electric power generation applications, the stationary hot gas path turbine components, i.e., the nozzles and turbine bucket shrouds, are attached directly to massive turbine shell structures and the shrouds are susceptible to bucket tip clearance rubs as the turbine shell thermally distorts. That is, the thermal growth of the turbine shell during steady-state and transient operations is not actively controlled and bucket tip clearance is therefore subject to the thermal characteristics of the turbine. Bucket tip clearance in these heavy duty industrial gas turbines is typically determined by the maximum closure between the shrouds and the bucket tips (which usually occurs during a transient) and all tolerances and unknowns associated with steady-state operation of the rotor and stator.

Steam cooling of hot gas path components has been proposed, utilizing available steam from, for example, the heat recovery steam generator and/or steam turbine components of a combined cycle power plant. Where steam is utilized as the coolant for gas turbine components, there is typically a net efficiency gain inasmuch as the gains realized by not extracting compressor bleed air for cooling purposes (typically in an open-cycle configuration) more than offset the losses associated with the use of steam as a coolant instead of providing energy to drive the steam turbine. The steam cooling concept is even more advantageous when the steam coolant is provided in a closed loop whereby the heat energy imparted to the steam as it cools the gas turbine components is recovered as useful work in driving the steam turbine.

Because of the differences in heat transfer characteristics between air and steam, it would be expected that turbine components designed to utilize these two cooling mediums would be constructed differently. For example, a turbine nozzle designed to be cooled by closed-loop steam cooling would be expected to be substantially different from a nozzle cooled by open-cycle air cooling. The internal passages which provide convection cooling would be shaped differently and, whereas in the case of steam cooling the coolant would be recovered from the nozzle to provide useful work elsewhere, in the case of air cooling, the air would typically be discharged through holes in the walls of the nozzle partitions to form a coolant film over the cooled component.

For a gas turbine to have the flexibility to be cooled with either air or steam (a feature of the present invention described below), it is necessary to provide the ability to interchange certain components (those to be cooled) to accommodate the different cooling mediums. A customer purchasing a simple cycle gas turbine power plant, for example, would almost certainly need to have the turbine components cooled by air, there being no available source of alternative coolant. If, however, the customer later expands his plant to an uprated combined cycle plant, steam becomes readily available as a coolant and it would be advantageous, from an efficiency point of view, to utilize this steam to cool the turbine, necessitating a change in at least some of the hot gas path components. Removal of the stationary hot gas path components for maintenance and replacement in respective air and steam-cooled turbines typically involves major downtime and costs. Additionally, in the case of steam cooling, direct connection of steam cooling pipes between the actively cooled hot gas path components and a single turbine shell make component removal impossible without rotor removal or an overly large shell diameter. Further, cost-effective maintenance and repair of gas turbines requires change-out of all hot gas path components without rotor removal.

Thermodynamic performance of a gas turbine is a primary characteristic in determining the economic value of the turbine. Turbine bucket tip clearance is a primary contributor to improved thermodynamic performance. In current practice, the stator components are mounted on a single turbine shell. Turbine shell distortion caused by thermal and mechanical loads manifests itself as circumferential variation in radial location of the bucket shrouds and nozzle diaphragms. This circumferential asymmetry is currently accounted for by increased bucket tip to shroud operating clearances as noted previously. This has a very substantial negative impact on thermodynamic performance. Consequently, there is a need to minimize the variation in radial clearance between the shroud and bucket tips to improve turbine performance. Tip clearance control becomes even more critical with steam cooling due to the possibility of steam leakage into the hot gas path due to rubs.

It will be appreciated that a bucket utilizing a closed circuit cooling system returns all of the thermal cooling medium to be used elsewhere in the system without dispersing it into the hot gas path as in an air-cooled system. This increases the difficulty of cooling the bucket tip. Therefore, the bucket tip cap must be significantly thinner than in an open circuit cooling design to enhance conductive cooling of the tip. The reduced tip thickness increases the likelihood that a rub against, or contact with, the shroud would penetrate the cooling passages, causing evacuation of the cooling medium and potential bucket failure. Consequently, tip clearance control, particularly in a closed circuit cooling design where the components are readily removable, is of critical importance.

DISCLOSURE OF THE INVENTION

According to the present invention, a turbine is provided with inner and outer shells. For discussion purposes, the turbine preferably comprises four stages with the inner shell mounting the first and second stage nozzles, as well as the first and second stage shrouds, while the outer shell mounts the third and fourth stage nozzles and shrouds. It will be appreciated, however, that a greater or lesser number of turbine stages, as well as a different number of nozzle stages and shrouds supported by the inner and outer shells, may be provided. Each of the inner and outer shells is formed in circumferentially extending sections about the rotor axis, preferably in two circumferential halves (upper and lower) of 180° each. The upper outer shell half and each inner shell half are individually removable from the turbine without removal of the rotor to enable access to the hot gas path components for maintenance, repair and/or changeover between air and steam cooling components.

Where an air-cooled turbine is provided, it will be appreciated that cooling air is provided to the stationary components, e.g., the first and second stage nozzles, and those components are carried by the inner shell in communication with high pressure air from the compressor. The first stage nozzle may lie in open communication with the high pressure discharge in the cavity supplying high pressure air to the combustors. Separate piping may be provided for supplying a lower pressure cooling air from the compressor extraction grooves through the outer shell into a cavity between the inner and outer shells and into the second stage nozzles. The cooling air provided is, of course, in an open circuit, the air exiting the partitions or vanes of the first and second stage nozzles for film cooling into the hot gas stream. Cooling air may similarly be piped directly through the outer shell to the third stage nozzle while the fourth stage nozzle remains uncooled. Additionally, air is introduced into the turbine rotor and into the turbine buckets of the first and second stages in an open-loop circuit whereby spent cooling air is discharged into the hot gas stream.

In a closed-circuit steam cooling system for the turbine, cooling steam is provided each of the nozzle partitions of the first and second stages by way of discrete steam supply and spent cooling steam exit pipes, coupled to the partitions through the inner shell and releasably coupled at their outer ends to the outer shell. The couplings between the steam pipes and the outer shell are accessible externally of the turbine whereby access to the hot gas path components for maintenance and repair can be obtained, as explained below. Additionally, closed-circuit steam cooling supply and spent cooling steam return conduits are provided through the rotor and into the buckets of the first and second stages. In the air and steam cooling arrangements for the preferred four stage turbine embodiment, the third stage is air-cooled, while the fourth stage remains uncooled. The present invention is concerned with the inner and outer shells, their mounting to one another, accessibility to the turbine rotor components and tip clearance control in the context of the inner and outer shells. For a complete description of the air and steam cooling circuits for the rotational components, i.e., the rotor and buckets, of which the present invention forms a part, reference is made to co-pending patent application Ser. No. 08/414,695, filed Mar. 31, 1995, now U.S. Pat. No. 5,593,274, issued Jan. 14, 1997, titled "Closed or Open Circuit Cooling of Turbine Rotor Components", and for a disclosure of the first and second stage steam-cooled buckets, reference is made to patent application Ser. No. 08/414,700, filed Mar. 31, 1995, now U.S. Pat. No. 5,536,143, issued Jul. 16, 1996, titled "Closed Circuit Steam-Cooled Bucket", the disclosures of which are incorporated herein by reference. Also, for a disclosure of the first and second stage steam-cooled vanes, reference is made to patent application Ser. No. 08/414,697, filed Mar. 31, 1995, now U.S. Pat. No. 5,634,766, issued Jun. 3, 1997, titled "Turbine Stator Vane Segments Having Combined Air and Steam Cooling Circuits", the disclosure of which is incorporated herein by reference. Consequently, it will be appreciated that to effect a changeover in a single turbine from air to steam cooling, certain component parts must be designed, removed and/or replaced to accommodate the different cooling mediums. Hence, convenient access to the hot gas path components without rotor removal is essential. The hot gas path components which must be interchanged comprise the first and second stage nozzles and buckets and associated piping for the air and steam cooling circuits as appropriate. All other components of the turbine, however, remain common. That is, the inner and outer shell, the third and fourth stages, as well as all rotor wheels and spacer disks and axial rotor bolts remain the same.

To accomplish this changeover between air and steam cooling components and/or to obtain access to the hot gas path components for maintenance and/or repair, the outer shell is provided in upper and lower sections (e.g., two halves), each mounting portions of the third and fourth stage nozzles and shrouds of the four stage turbine. The various inlet and exit heating/cooling fittings extending through the outer shell sections and connected to piping carried by the inner shell to afford tip clearance control (discussed below) and to cool the hot gas path airfoils for either air or steam cooling, may be accessed externally of the outer shell for disconnection (as well as for connection). Rollers are disposed through access openings in the lower outer shell half to support the inner shell. Pins carried by the inner shell coupling the inner and outer shells together and supporting the inner shell from the outer shell are then uncoupled from the outer shell through access openings in the outer shell. Upon uncoupling the pins, disconnecting the pipe fittings from the outer shell and installing the rollers, the upper section of the outer shell is disconnected from the lower section thereof at the horizontal joint. The upper outer shell section is then lifted and removed, together with the associated third and fourth stage nozzle assembly halves carried thereby. This provides access to the upper inner shell section carrying the first and second stage nozzles.

Upon disconnecting the upper and lower sections of the inner shell from one another (e.g., at the horizontal joint between the section halves), the upper inner shell section with its assembled shrouds, nozzle stages and associated interior piping for tip clearance control and steam or air cooling, may be removed through the access opening formed by the removal of the upper outer shell section. In the case of the steam-cooled turbine, the supply and exit steam pipes are mounted on the inner shell and releasably coupled to the outer shell via adapter fittings accessible externally of the outer shell. Thus, by removal of the adapter fittings, the internal steam cooling piping carried by the inner shell is spaced radially inwardly of the outer shell. A simulated or dummy inner shell section of comparable weight to the removed inner shell section is then disposed in the access opening and both the dummy section and the lower inner shell section are rotated about the rotor axis and on the rollers to locate the previously located lower inner shell section in an upper position in registration with, and enabling its removal through, the turbine access opening. Thus, the entire first and second stage nozzle assembly is readily removed, affording access for the replacement or repair of stationary components (i.e., nozzles and shrouds), or conversion between air and steam cooling.

In another aspect of the present invention, the inner and outer shells are connected to one another in a manner providing for an initial accurate minimum setting of the clearance between the bucket tips and the shrouds by enabling initial adjustment of the radial position of the inner shell relative to the rotor and the outer shell and, during turbine operation, enabling thermal growth, i.e., expansion and contraction, of the inner shell relative to the outer shell. To accomplish this, the inner shell is mounted to the turbine outer shell, preferably solely by a plurality of circumferentially spaced pins carried by the inner shell in radial planes at axial spaced locations preferably passing through the first and second stage shrouds. The pins project radially and are adjusted, e.g., by adjusting screws accessible externally of the outer shell to locate the inner shell accurately and precisely relative to the axis of the rotor, thereby affording initial close clearances between the bucket tips and the shrouds of the inner shell. Each pin restrains circumferential displacement and concentricity of the inner shell relative to the outer shell and the location of the pins about the shell prevent radial displacement of the inner shell relative to the outer shell. However, the pins enable unrestrained radial movement of the inner shell relative to the outer shell due to thermal growth, i.e., expansion and contraction, so that control over tip clearance can be maintained during turbine operation by the tip clearance control system, which will now be described.

In a further aspect of the present invention, positive control of the thermal expansion and contraction of the inner shell relative to the outer shell is maintained to actively control tip clearance during turbine operation, To accomplish this, each semi-cylindrical, integrally cast or fabricated, inner shell half has an internal, generally circumferentially extending passageway or plenum in a radial plane at an axial location containing the first stage shrouds and a second internal, generally circumferentially extending plenum in a second radial plane at an axial location containing the second stage shrouds. The plenums are connected to one another by passageways within the inner shell. A thermal medium, from an auxiliary source independent of the turbine, is supplied to the plenums about the first and second stage shrouds through a fitting releasably secured to the inner shell and passing through the outer shell of the turbine. The source may comprise a cooling and/or heating fluid, preferably air, supplied by an auxiliary closed-cycle system comprised of, for example, a motor-driven compressor, a heat exchanger and a heater. The heating/cooling fluid is piped from the auxiliary system, circulated through the inner shell plenums about the first and second stage shrouds and returned. This heating/cooling fluid thus controls, as a function of turbine operation, the temperature and hence the thermal movement (i.e., radial expansion and contraction) of the inner shell relative to the outer shell. Consequently, the radial locations of the first and second stage shrouds about the first and second stage bucket tips, respectively, are actively controlled during both steady state and transient operations.

By way of example, during a hot restart of the turbine where the turbine has been previously running for a long period of time and the component parts are hot, severe rubbing of the turbine bucket tips may occur due to the difference in cool-down rates between the shrouds and the rotor. That is, the surrounding shrouds and support structure may cool faster than the rotor and shrink radially inwardly while the centrifugal action of the spinning rotor during a hot restart essentially elongates the buckets potentially into tip contact with the shrouds. By supplying a heating/cooling medium, e.g., air or steam, to the plenums in the inner shell, the radial dimension of the inner shell can be actively and substantially uniformly adjusted during both transient and steady state operations to control and thereby minimize tip clearance. Thus, by initially establishing a minimum tip clearance and actively controlling tip clearance during operation, improved turbine performance is achieved.

In a preferred embodiment according to the present invention, there is provided a turbine comprising a rotor carrying buckets forming part of a turbine stage, an inner shell carrying nozzles and a shroud for surrounding tips of the buckets, an outer shell about the inner shell and connections between the inner and outer shells for supporting the inner shell against radial and circumferential movement and enabling thermal expansion and contraction of the inner shell relative to the outer shell in radial directions, the inner shell having a passage for containing a thermal medium to control the thermal expansion and contraction of the inner shell about the bucket tips thereby actively maintaining clearance between the shroud and the bucket tips during turbine operation.

In a further preferred embodiment according to the present invention, there is provided a turbine, comprising an outer structural shell, an inner shell connected to the outer shell and carrying a nozzle and a shroud for a turbine stage, said shroud surrounding tips of buckets carried by a turbine rotor and a plurality of connecting elements engaging between the inner and outer shells aligning the inner shell about the rotor.

In a still further preferred embodiment according to the present invention, there is provided a method of operating a turbine having a rotor including buckets carried thereby forming part of a turbine stage, an outer containment shell, an inner shell about the rotor including nozzles carried thereby forming another part of the turbine stage and a shroud about the tips of the buckets, and a passage in the inner shell for flow of a thermal medium to control thermal growth of the inner shell, comprising the steps of connecting the inner shell and the outer shell to one another to preclude radial and circumferential movement of the inner shell relative to the structural outer shell and enable thermal radial expansion and contraction of the inner shell relative to the structural outer shell, and flowing the thermal medium through the passage to control the temperature and thermal radial expansion and contracting of the shell thereby to control the clearance between the bucket tips and the shroud.

In a still further preferred embodiment according to the present invention, there is provided in a turbine having a rotor, a method of positioning an inner shell carrying a shroud about the tips of turbine buckets carried by a turbine rotor, the inner shell being supported by an outer shell of the turbine, comprising the step of disposing radially directed, circumferentially spaced pins between and in engagement with the outer shell and the inner shell to restrain radial and circumferential relative movement of the inner and outer shells and enable substantially unrestrained thermal expansion and contraction of the inner and outer shells relative to one another.

In a still further preferred embodiment according to the present invention, there is provided in a turbine having a rotor and an axis, a method of positioning an inner shell carrying a shroud about tips of turbine buckets carried by a turbine rotor, the inner shell being supported by an outer shell of the turbine, comprising the steps of disposing radially directed, circumferentially spaced pins in a radial plane between and in engagement with the outer shell and the inner shell and adjusting at least a pair of the pins for positioning the inner shell relative to the bucket tips carried by the rotor and the rotor axis.

In a still further preferred embodiment according to the present invention, there is provided a method of removing at least one of inner shell sections carrying attached nozzle stage and shroud portions from a turbine having an outer housing including at least two outer shell sections overlying the inner shell sections, comprising the steps of disconnecting an outer shell section from the turbine housing and another of the outer shell sections, removing the disconnected outer shell section from the turbine housing to define an access opening into the turbine and removing an inner shell section with attached nozzle stage and shroud portions through the access opening.

In a still further preferred embodiment according to the present invention, there is provided in a multi-stage turbine having hot gas path components cooled by one of air and steam cooling circuits, a method of converting between air and steam cooling circuits in the turbine, comprising the steps of removing the hot gas path components cooled by one of the air and steam cooling circuits from the turbine and replacing the removed hot gas path components with hot gas path components cooled by another of the air and steam cooling circuits.

Accordingly, it is a primary object of the present invention to provide a gas turbine having a removable inner shell supporting hot gas path components affording access to the turbine stages without removing the turbine rotor, positive bucket tip clearance control and conversion between air and steam cooling circuits and related methods.

BEST MODE FOR CARRYING OUT THE INVENTION

Figure 1:
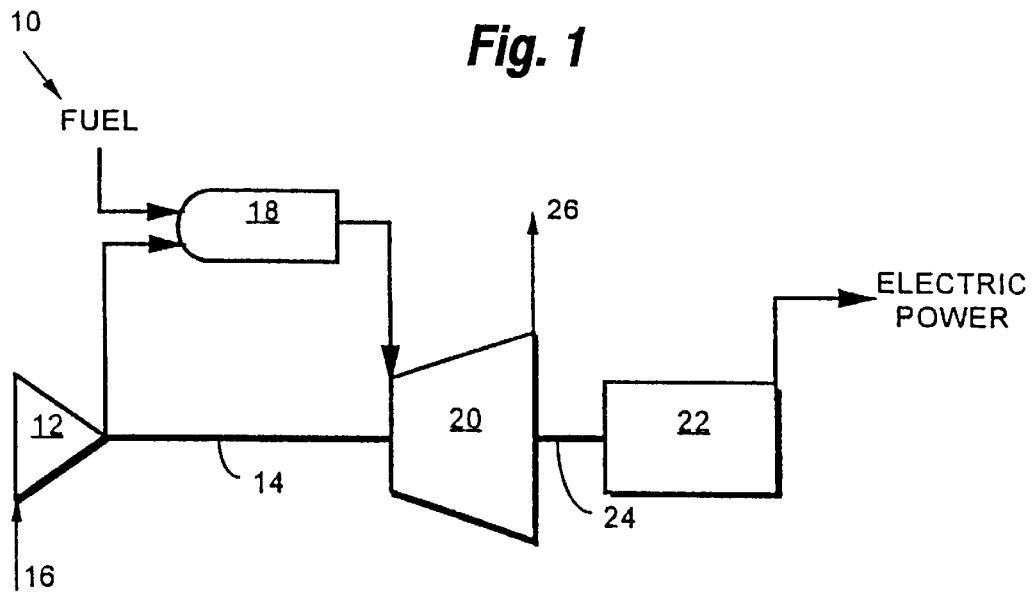
FIG. 1 is a schematic illustration of a gas turbine incorporating the present invention.

FIG. 1 is a schematic diagram for a simple cycle, single-shaft heavy-duty gas turbine 10 incorporating the present invention. The gas turbine may be considered as comprising a multi-stage axial flow compressor 12 having a rotor shaft 14. Air enters the inlet of the compressor at 16, is compressed by the axial flow compressor 12 and then is discharged to a combustor 18 where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity. A typical simple cycle gas turbine will convert 30 to 35% of the fuel input into shaft output. All but 1 to 2% of the remainder is in the form of exhaust heat which exits turbine 20 at 26. Higher efficiencies can be obtained by utilizing the gas turbine 10 in a combined cycle configuration in which the energy in the turbine exhaust stream is converted into additional useful work.

Figure 2:
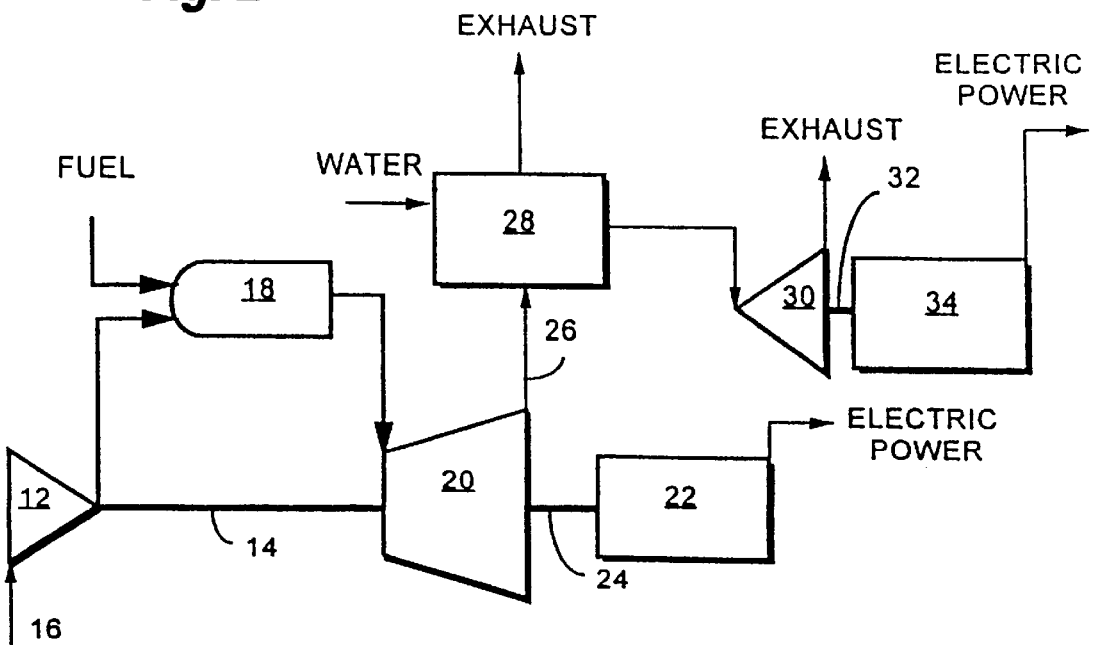
FIG. 2 is a schematic diagram of a combined cycle system incorporating the present invention and employing a gas turbine and heat recovery steam generator for greater efficiency.

FIG. 2 represents a combined cycle in its simplest form, in which the exhaust gases exiting turbine 20 at 26 enter a heat recovery steam generator 28 in which water is converted to steam in the manner of a boiler. Steam thus produced drives a steam turbine 30 in which additional work is extracted to drive through shaft 32 an additional load such as a second generator 34 which, in turn, produces additional electric power. In some configurations, turbines 20 and 30 drive a common generator. Combined cycles producing only electrical power are in the 50 to 60% thermal efficiency range using the more advanced gas turbines.

Figure 3:
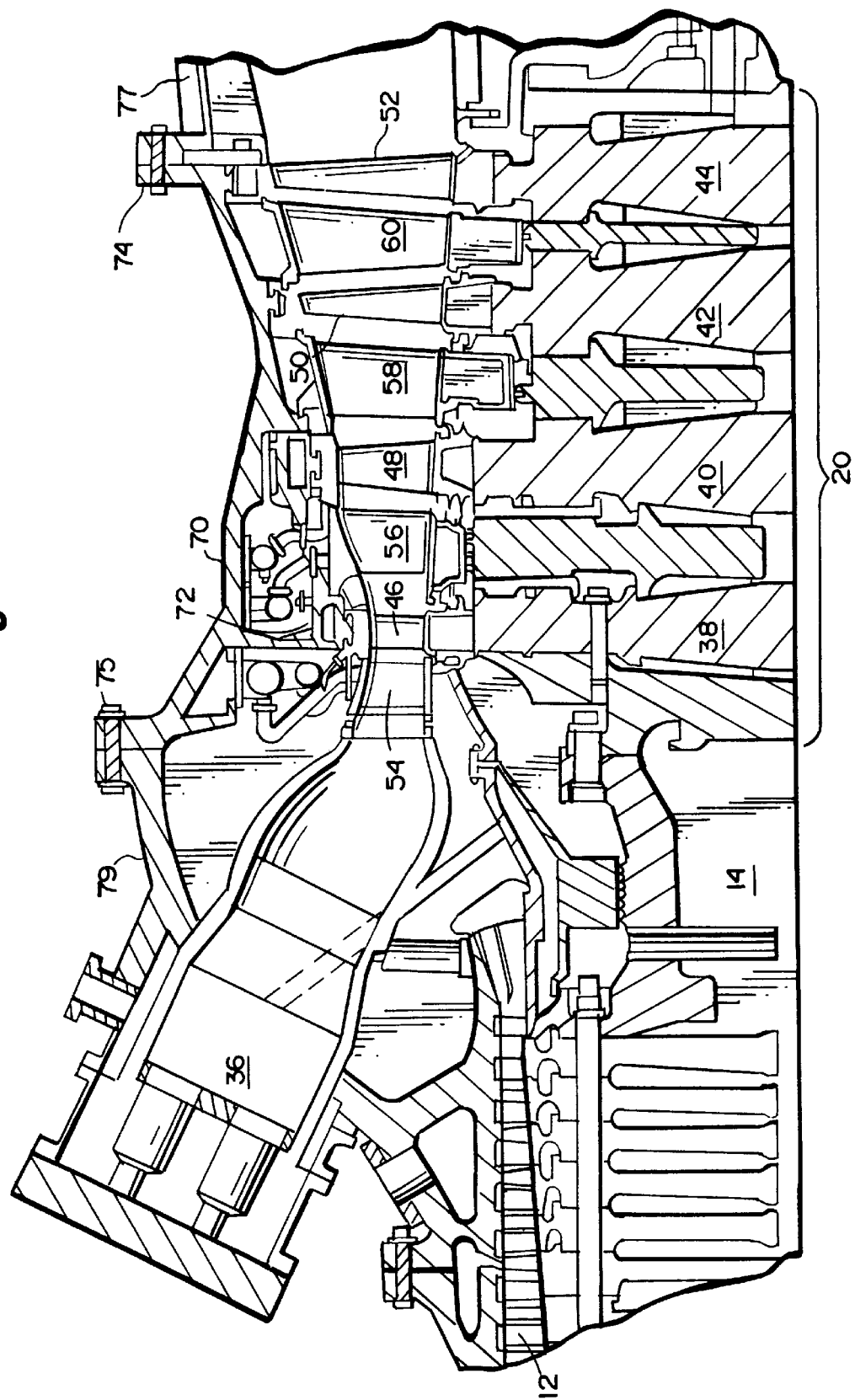
FIG. 3 is a cross-sectional view of a portion of a turbine illustrating its combustor, compressor and turbine sections.

FIG. 3 illustrates in greater detail the gas turbine which is the focus of the present invention and which, preferably, is used in the combined cycle configuration of FIG. 2. Air from the compressor 12 is discharged to the combustion cans comprising combustor 18, the combustion cans being located circumferentially about the rotor shaft 14 in the usual fashion, one such "can" being shown at 36. Following combustion, the resultant combustion gases are used to drive the turbine section 20, which includes in the instant example four successive stages represented by four wheels 38, 40, 42 and 44 comprising the turbine rotor and mounted to the rotor shaft 14 for rotation therewith, and each carrying a row of buckets represented, respectively, by blades 46, 48, 50 and 52, which are arranged alternately between fixed nozzles represented by vanes 54, 56, 58 and 60, respectively. Thus, it will be appreciated that a four-stage turbine is illustrated wherein the first stage comprises nozzles 54 and buckets 46; the second stage, nozzles 56 and buckets 48; the third stage, nozzles 58 and buckets 50; and the fourth stage, nozzles 60 and buckets 52.

Figure 4:
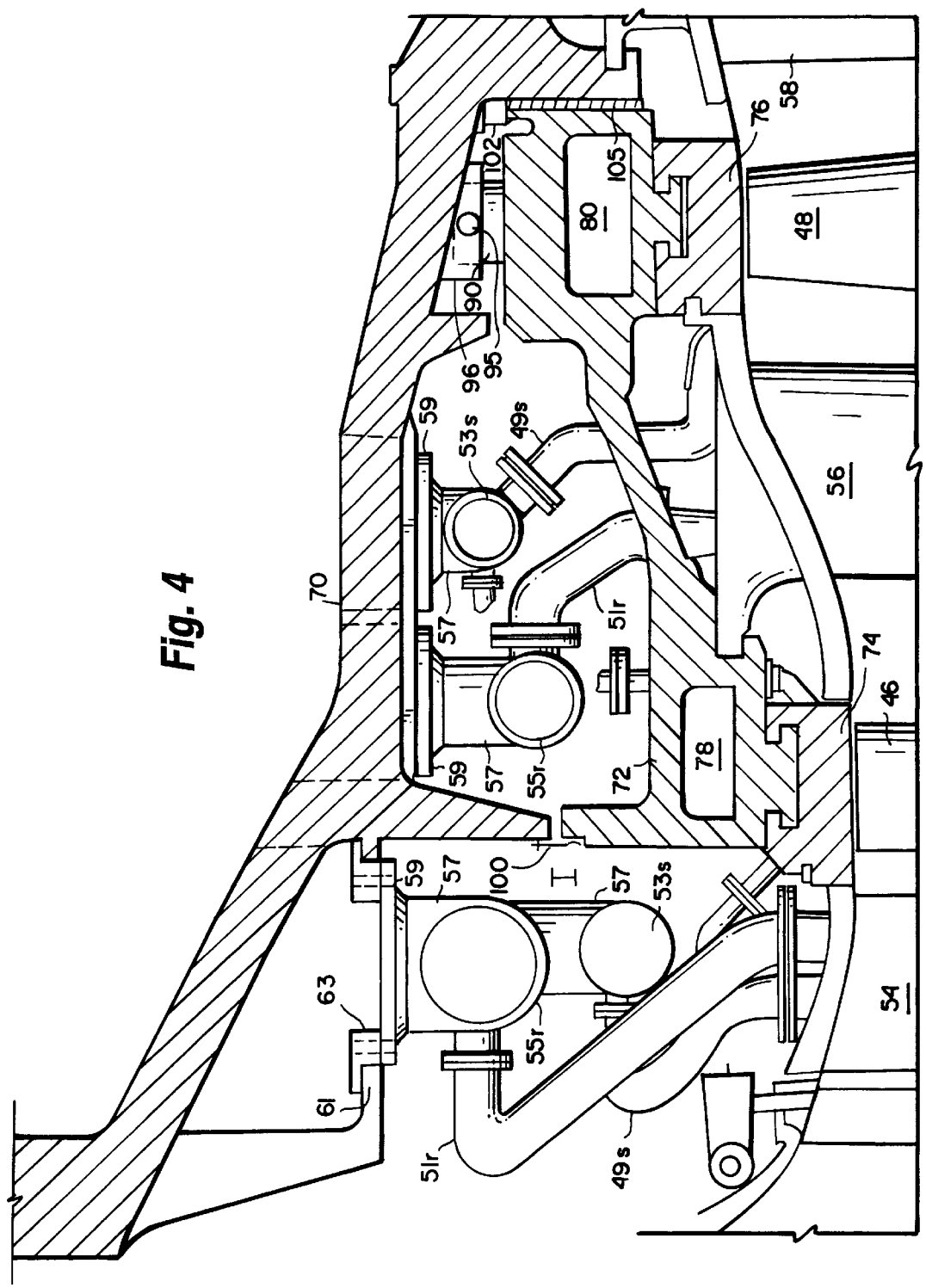
FIG. 4 is an enlarged fragmentary cross-sectional view of a portion of the turbine illustrated in FIG. 3.

Referring now to FIG. 4, the turbine is shown to include an outer structural containment shell 70 and an inner shell 72, the latter mounting the shrouds 74 and 76 for the first and second stages. As best illustrated in FIG. 3, the outer shell 70 is secured at axially opposite ends to the turbine exhaust frame 77, for example, by bolts 74, and at its upstream end to the compressor discharge casing 79 by bolts 75. It will be appreciated that the outer and inner shells 70 and 72 each comprise shell sections, preferably arcuate shell halves, extending substantially 180° for each shell half, about the rotor axis. Thus, the outer shell halves are bolted to the remaining turbine housing at axially opposite ends and to one another at a horizontal joint, not shown. It will be appreciated that the inner shell sections 72, as well as the outer shell sections 70, are each formed of integral castings or fabrications which are responsive to temperature changes and, hence, expand or contract depending upon the temperature changes.

The axial extent of turbine inner shell 72 can be from one to all turbine stages, though in the preferred embodiment of FIGS. 3 and 4, it is shown as having an axial extent covering the first two of the illustrated four turbine stages and, in particular, two stages of stationary shrouds 74, 76 that are attached to it. The turbine inner shell 72 is not a pressure vessel nor a final containment vessel and, as such, does not require the structural integrity or flange sizes required by the outer turbine shell 70. This minimizes its thermal and mechanical distortion.

Still referring to FIG. 4, the inner shell 72 carries respective cooling medium supply and return pipes 49s and 51r for cooling each of the first and second stage nozzle vanes 54 and 56, respectively. These individual supply and return pipes are permanently connected by suitable flanges and gaskets to arcuate supply and return conduits 53s and 55r, respectively, spaced radially outwardly of the inner shell 72 radially inwardly of the outer shell 70, and extending circumferentially about the inner shell 72. Each conduit 53s and 55r has a pipe fitting 57 terminating in a radial outer annular flange 59 spaced radially inwardly of an associated access opening through the outer shell. Each access opening includes an annular flange having a plurality of bolt holes, e.g., flange 61 in FIG. 4. An adapter fitting 63, i.e., an annular flange with concentric sets of annular bolt holes, enables the pipe fittings to be releasably secured to the outer shell with access to the bolts to effect connection and disconnection between the outer shell 70 and pipe fittings 57 afforded through the access openings of the outer shell. That is, the bolts connecting the adapter fittings 63 to the pipe fittings 57 as well as connecting the fittings 63 to the outer shell 70 are both accessible externally of the outer shell 70. Consequently, by disconnecting the cooling supply and return pipes 49s and 51r, respectively, from the outer shell, leaving a space between each flange 59 and the inner surface of the outer shell, the outer and inner shells can be removed, as described below, to enable access to the rotatable turbine components for maintenance and repair. Additionally, with this configuration, air cooling stationary components can be readily replaced by steam cooling components using common parts of the rotor for both cooling mediums, e.g., wheels, spacers, third and fourth stage buckets, and other parts, as well as the outer shell.

Figure 7:
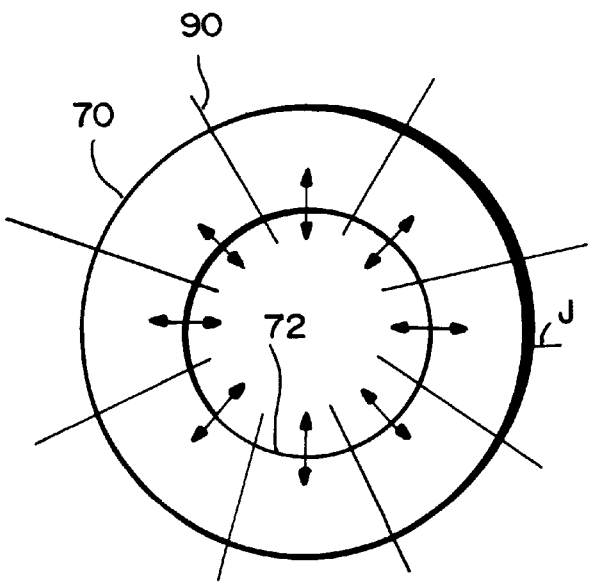
FIG. 7 is a schematic view taken along an axial plane illustrating the location of the pin connections between the inner and outer shells.
Figure 6:
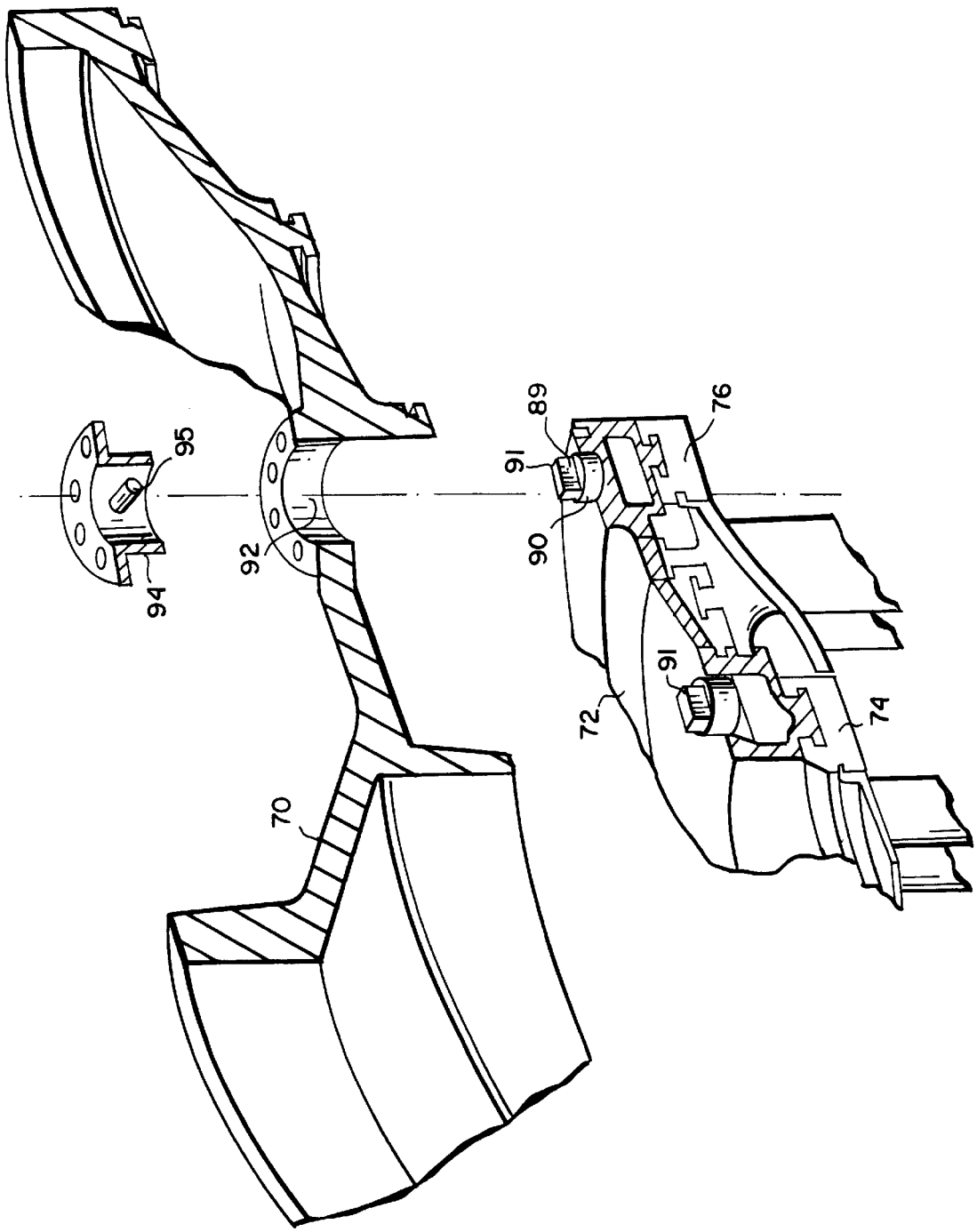
FIG. 6 is a fragmentary exploded perspective view illustrating portions of the connections between the inner and outer shells.
Figure 8B:
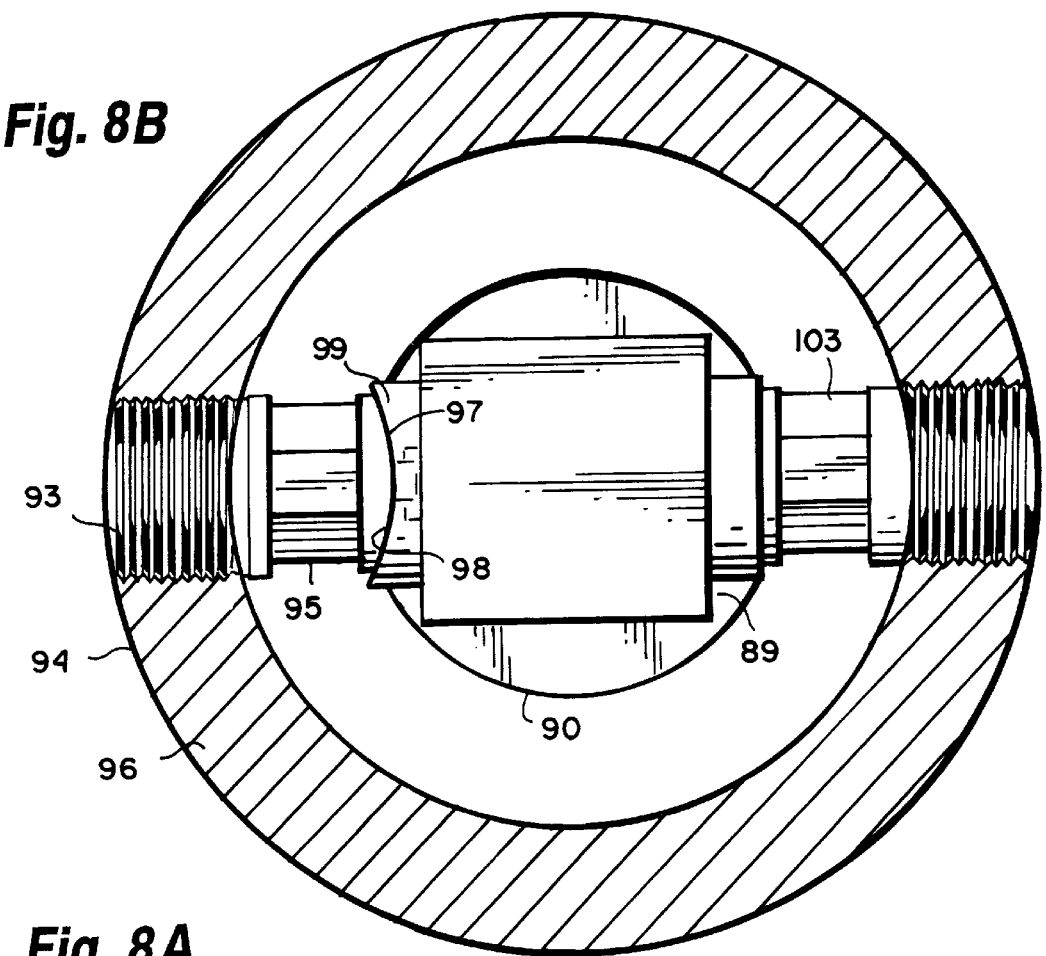
FIG. 8B is an enlarged cross-sectional view looking radially inwardly through a top hat illustrating the connection between the inner and outer shells enabling fixation of the inner shell against radial and circumferential movement and relative thermal expansion and contraction.
Figure 8A:
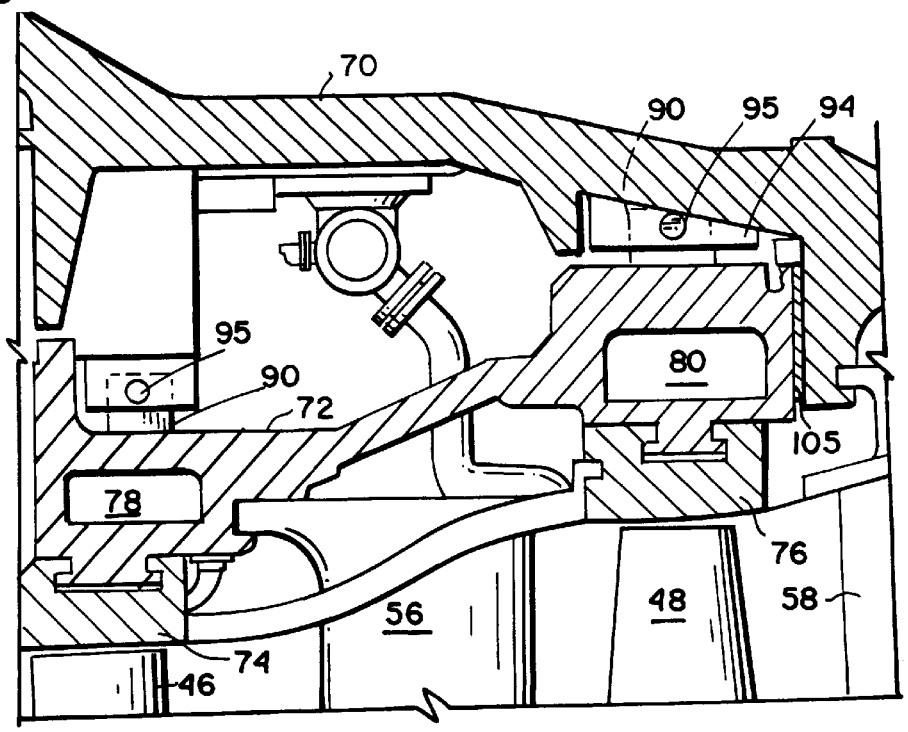
FIG. 8A is a fragmentary cross-sectional view of a portion of the inner shell illustrating the connection between the inner and outer shells.

Referring now to FIGS. 6, 7 and 8A, the inner shell 72 is secured to the outer shell 70 along radial planes normal to the axis of the rotor and at axial locations preferably in alignment with the first and second stage buckets and shrouds. To accomplish this, a plurality of pins 90 are connected to and between the inner and outer shells in a manner preventing movement of the inner shell relative to the outer shell in radial and circumferential directions, yet enabling unrestrained movement in a radial direction as a result of thermal distortion. Preferably, the pins between the inner and outer shells lie in the radial planes at circumferentially spaced positions thereabout. For example, eight pin locations may be used to interconnect the shells at each axial location, with each pin 90 lying approximately 45° about the rotor axis from adjacent pins. As illustrated in FIG. 7, the pins are also spaced from a horizontal joint J between the inner shell halves 72, the radially extending arrows in FIG. 7 representing the thermal expansion and contraction of the inner and outer shells relative to one another.

The pins are preferably cylindrical, are secured to the inner shell and project radially outwardly therefrom to terminate in reduced sections 91 having flats 89 on opposite sides, i.e., the flats 89 face in a circumferential direction. The cylindrical radial inner ends of the pins are preferably shrunk-fit into complementary openings in and about the inner shell 72.

As best illustrated in FIGS. 6, 8A and 8B, top hats 94 are provided through access openings 92 (FIG. 6) in the outer shell 70 at the circumferential locations of the pins 90. The top hats 94 have flanges with bolt holes for bolting the top hats to ring flanges about the access openings 92 in the outer shell having corresponding bolt holes. The top hats 94 each have a substantially cylindrical, radially inward extension 96 terminating at their inner ends in female threaded lateral openings 93. Adjusting screws 95, illustrated in FIGS. 8A and 8B, have male threaded ends for threaded engagement in diametrically opposed threaded openings 93 and project radially inwardly of the cylindrical top hat extension 96. The openings 93 and screws 95 lie in a circumferential plane also intersecting the flats 89 on the radially outer ends of the pins. The inner ends of the screws each have a convex spherical head 97 (FIG. 8B) engaging a complementary concave surface 98 on a spherical washer 99 having a flat surface 101 slidably engageable with the flat 89 on one side of a pin 90. Each screw 95 has a series of flats 103 between its male threaded end and its head 97. This enables a tool, such as a wrench, not shown, to be passed inwardly within the diametrically large cylindrical top hat extension 96 and engaged about the flats to rotate the adjusting screws 95 whereby access to the screws 95 is available externally of the outer shell 70. It will be appreciated that four adjusting screws 95 spaced 90° one from the other about the top hat extension may be used (with four flats 90° from one another about pin 90), although only two such screws in a circumferential plane are preferable. A blind flange bolted to the top hat at the outer turbine shell outer diameter seals radial gas leaks around the pins.

The adjusting screws 95 can be selectively adjusted externally of the outer shell 70 to locate the inner shell 72 relative to the rotor axis with an initial minimum clearance between the shrouds 74 and 76 and the turbine buckets 46 and 48, respectively. As indicated previously, this arrangement secures the inner shell to the outer shell against circumferential and radial movement, but enables the inner shell to thermally distort, i.e., move radially relative to the outer shell in response to the application of the thermal medium in plenums 78 and 80 to facilitate the tip clearance control (as described below). When the inner shell is initially installed and adjusted by the adjusting screws 95 for alignment with the rotor axis, the pins 90 and screws 95 hold tight, running turbine tip clearances which can be maintained during steady-state and transient turbine operation by controlling the temperature of the inner shell through the supply of thermal medium from the heating/cooling source outside of and independent of the turbine to the plenums.

Significantly, the pins are located in two planes normal to the axis of the rotor and pass through the first and second stage shrouds, respectively. Pins 90 constitute the structural support for the inner shell relative to the outer shell. Seals 100 and 102 are provided at the opposite ends of the shells, as illustrated in FIG. 4, to minimize air flow between regions of different air pressure denoted as I, II and III. Also, a plurality of pads 105 are disposed at circumferentially spaced positions between an aft bulkhead of inner shell 72 and a forward bulkhead of outer shell 70 as illustrated in FIG. 4. Pads 105 carry the axial loadings on the inner shell to the outer shell.

Figure 5:
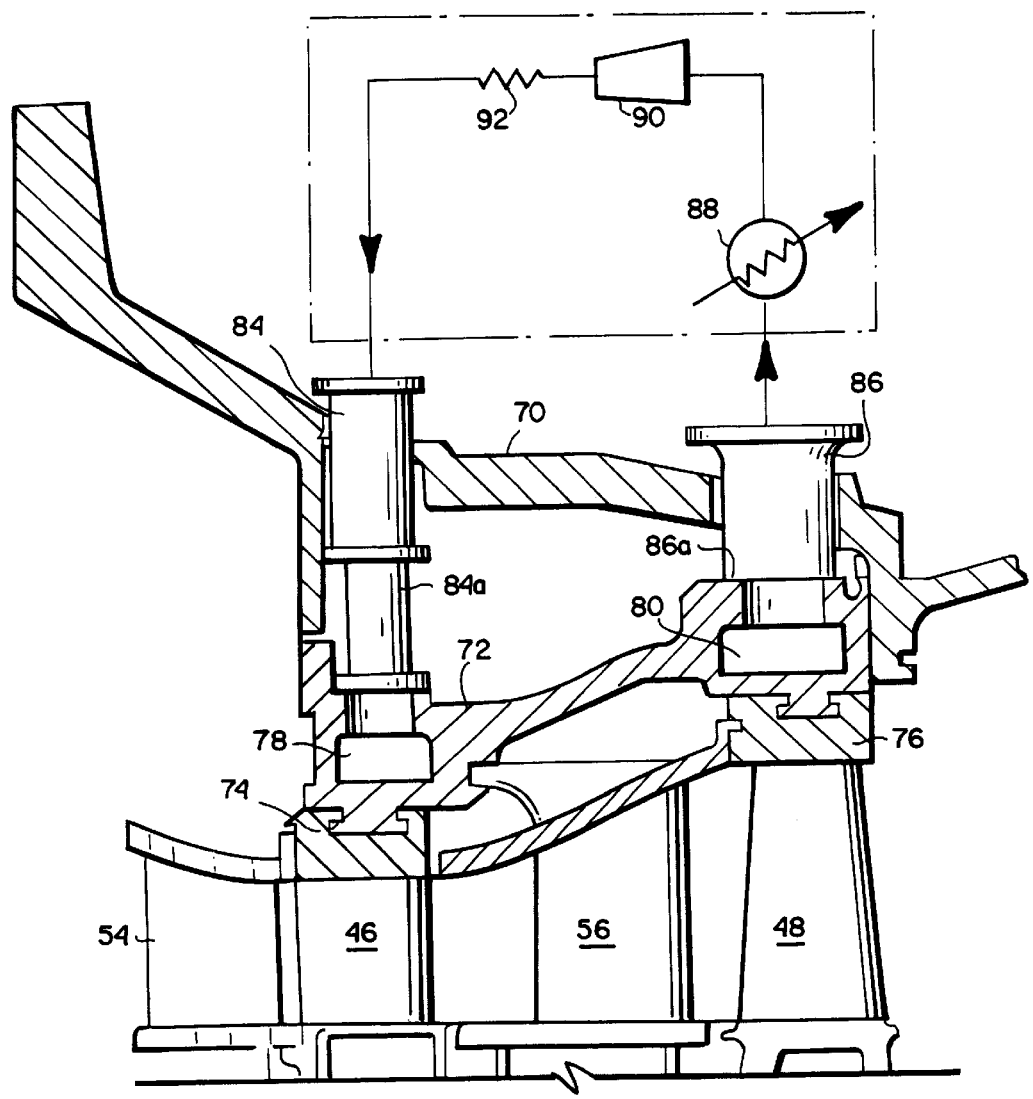
FIG. 5 is a reduced cross-sectional view illustrating the inner and outer shells, and first and second stage buckets and nozzles, together with piping and passages for controlling thermal expansion and contraction of an inner turbine shell half.
Figure 5A:
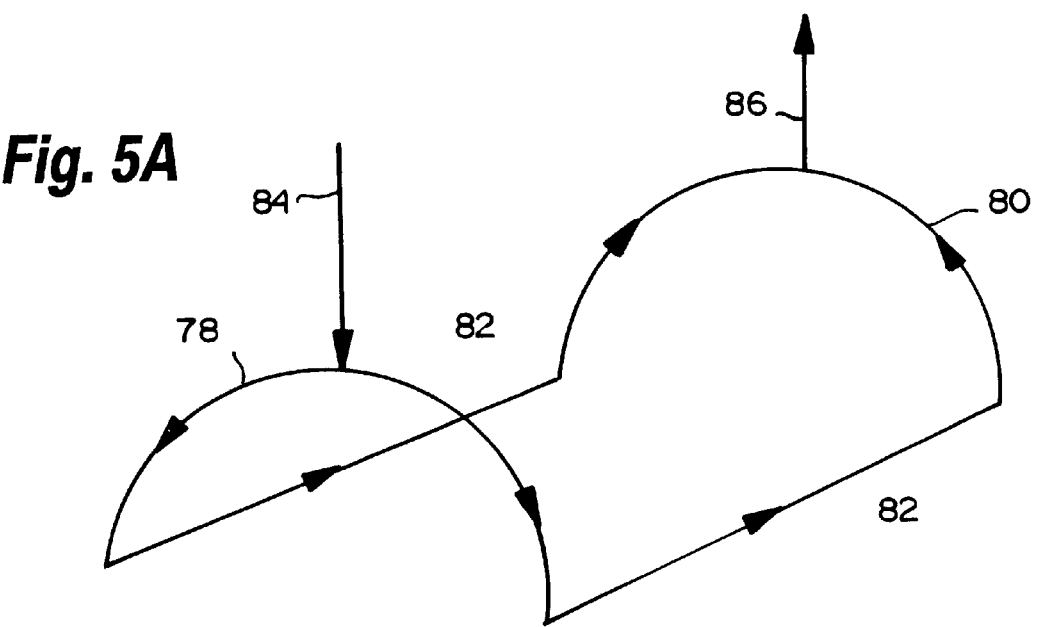
FIG. 5A is a schematic representation of the thermal circuit for the inner turbine shell half of FIG. 5.

In a preferred embodiment of the disclosed turbine, the running tip clearance between the tips of the turbine buckets 46 and 48 and the shrouds 74 and 76, respectively, is positively and actively controlled during steady-state turbine operation and transient conditions by controlling the temperature of the inner shell 72 and preferably controlling that temperature by employing a thermal medium in plenums 78 and 80 from, for example, a source independent of the turbine and its operation. To, in part, accomplish this objective, the inner shell 72 is supported by the plurality of pins 90 in radial planes passing through the first and second stage shrouds and buckets whereby the inner shell is supported from the outer shell against circumferential and radial movement solely by the pins and is enabled by the radially projecting pins to expand and contract in radial directions in response to thermal conditions, i.e., an applied thermal medium. Referring to FIGS. 5 and 5A, plenums or passages 78 and 80 are formed in the inner shell 72 at locations preferably radially outwardly of the shrouds 74 and 76, respectively. The plenums 78 and 80 extend arcuately in radial planes extending about each of the shell sections, e.g., the inner shell halves. As illustrated in FIG. 5A, the plenums 78 and 80 lie in serial communication one with the other by way of generally axially extending passageways 82 in each inner shell section adjacent its joint with an adjacent inner shell section. Thus, the passageways 82 interconnect the plenums 78 and 80 in a serial flow relationship. As illustrated in FIGS. 5 and 5A, an inlet pipe 84 extends through an access opening in the outer shell 70 for connection with an inlet fitting on the inner shell 72 whereby thermal medium may be passed through the outer shell 70 and into the plenum 78. Additionally, an outlet pipe 86 passes through an access opening in the outer shell 70 whereby thermal medium inlet to the inner shell plenums 78 and 80 may be discharged and returned to the thermal medium source. It will be appreciated that while the upper outer and inner shell halves are described and depicted, the lower outer and inner shell halves are substantially identical and that a description of one suffices as a description of the other. It will also be appreciated that, while only a single inlet pipe and a single outlet pipe are specifically disclosed for supplying thermal medium to the plenums of the shell sections, separate inlets and outlets may be provided the plenums 78 and 80. Also, the plenums 78 and 80 may be provided in plenum segments having separate inlets and outlets as desired without departing from the scope of the present invention.

Further, the inlet and outlet pipes 84 and 86 (FIG. 5), respectively, are releasably coupled to pipe connections 84a and 86a on the inner shell in communication with plenums 78 and 80, respectively, in a manner enabling disconnection and connection of the inlet and outlet pipes with the respective plenums externally of the outer shell 70. This can be accomplished by gasketed flange connections at the juncture of the inlet 84 and an extension 84a fixed to inner shell 72 and at the juncture of the outlet pipe 86 and a flange ring 86a about the opening to plenum 80, the bolts for which lie within inlets 84 and outlets 86 and are accessible externally of shell 70 through respective inlets 84 and outlets 86.

Referring again to FIG. 5, the thermal medium supplied to the plenums 78 and 80 is provided in this example by an external source independent of the turbine and preferably in a closed-loop circuit. The closed circuit may include a heat exchanger 88, a compressor 90 and a heater 92. In this manner, the thermal medium may provide cooling or heating thermal fluid to the plenums 78 and 80 via inlet 84 and outlet 86 in a closed circuit as necessary and desirable in accordance with the operating conditions of the turbine. The temperature of the heating/cooling medium supplied the plenums 78 and 80 may be controlled in accordance with a predetermined schedule based on historical temperatures of the turbine during start-up, running speed and transients, such as shut-down, whereby the inner shell can be controlled to expand or contract to counter the typical thermal mismatches encountered in turbine operation.

It will be appreciated that the pinned connections between the inner shell and the outer shell facilitate the tip clearance control. While the inner shell is fixed against radial and circumferential movement, the shell is responsive to controlled temperature inputs by way of the thermal medium to controllably expand or contract the inner shell to control the clearance of shrouds 74 and 76 relative to the tips of the buckets 46 and 48. For example, during start-up, the thermal medium supplied to the plenums 78 and 80 is a heating fluid. By heating the inner shell, it may be expanded at a rate equal to or greater than the rate of thermal expansion of the rotor and buckets. The radially projecting pins 90 thus slide in a radial outward direction along the flat faces of washers 99, enabling expansion of the inner shell and its shrouds relative to the outer shell to maintain clearance between the shrouds and the bucket tips. During a transient, the inner shell may tend to contract faster than the rotor, hence displacing the shrouds radially inwardly toward the bucket tips. In that event, heating fluid is supplied the plenums such that the rate of thermal contraction of the inner shell is less than the rate of thermal contraction of the rotor and buckets to avoid contact between the turbine tips and shrouds. During steady-state operation, the temperature of the thermal medium is controlled to maintain a predetermined clearance between the shrouds and bucket tips. Thus, during all active thermal distortions of the shells, the connections between the adjusting screws carried by the outer shell and the pins carried by the inner shell permit relative sliding motion between the flats of the pins and the washers of the adjusting screws to enable tip clearance control. The inner shell is otherwise unsecured except for the seals at opposite axial ends thereof.

Figure 12:
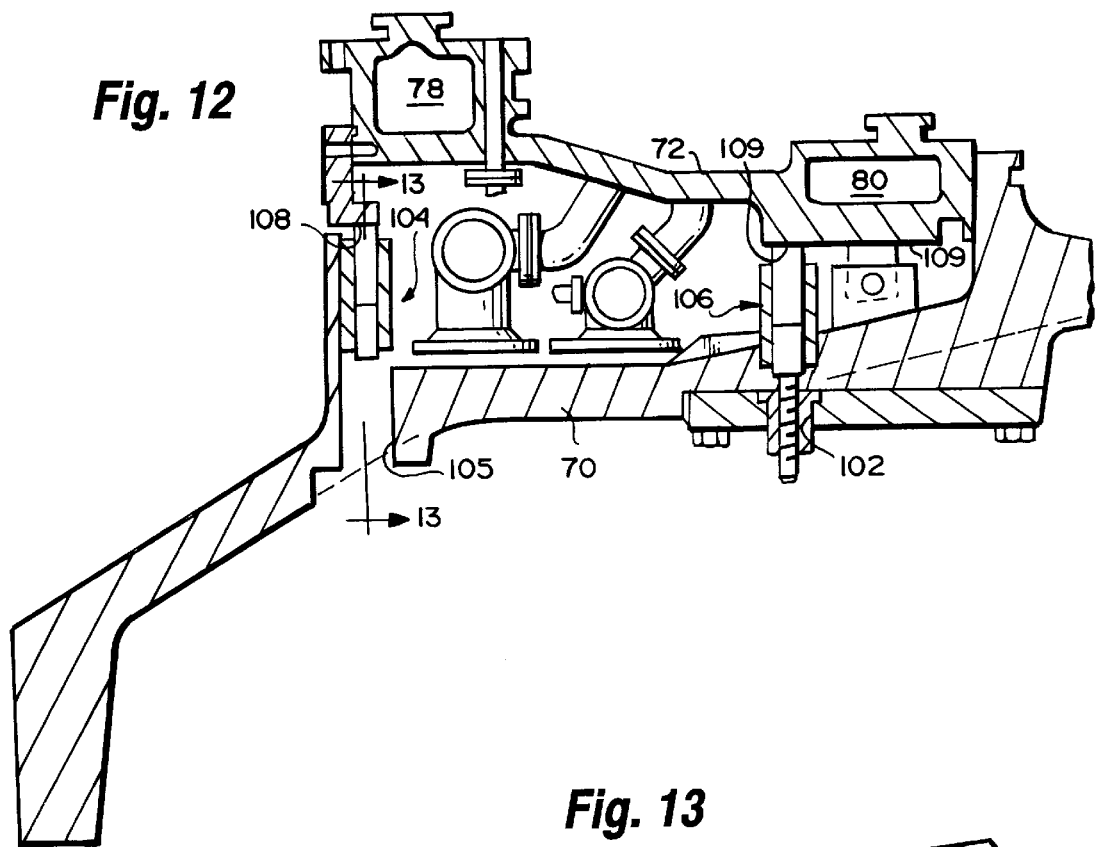
FIG. 12 is a fragmentary cross-sectional view illustrating rollers inserted through the outer shell for supporting the inner shell during disassembly and assembly of the turbine parts.

Another aspect of the present invention resides in the capability to access the turbine and remove the hot gas components of the turbine stages without removal of the rotor from the turbine. Referring again to FIG. 3, it will be appreciated that the outer shell 70 of the turbine carries the third and fourth stage nozzles 58 and 60 in the present preferred four-stage turbine, whereas the inner shell 72 supports and carries the first and second stage nozzles 54 and 56, respectively. Also, as stated previously, the inner and outer shells are each provided, preferably, in upper and lower shell halves. Elongated access openings 103 are formed along the lower outer shell half as schematically illustrated in FIG. 12. Roller assemblies 104 are inserted into the elongated access openings and engage the inner shell 72 for supporting the inner shell from the rollers and enabling the inner shell to rotate on the rollers. A second set of rollers is used in the same set of holes that top hats 94 use. The top hats are removed, one at a time, and the roller assemblies installed. The rollers are offset from pins 90, thereby allowing the inner shell to be rolled out without removing the pins. Roller assemblies 104, 106 are inserted into access openings 125, 102, respectively, and into contact with lands 108, 109, respectively, which form part of the inner shell 72.

Figure 13:
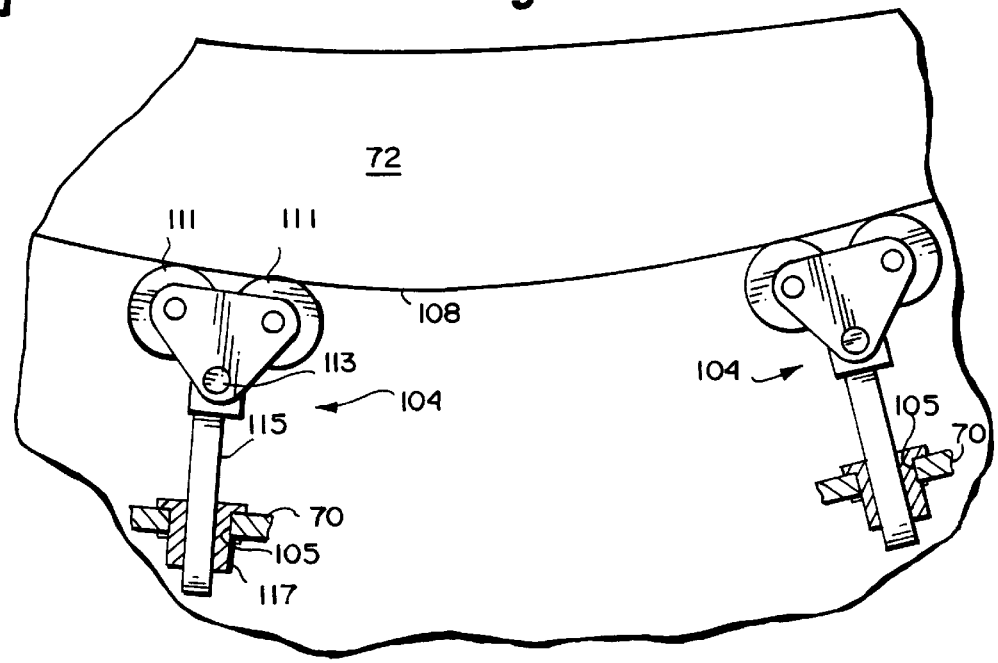
FIG. 13 is an enlarged cross-sectional view of the rollers carrying the inner shell and taken generally about on line 13—13 in FIG. 12.

As shown in FIG. 13, roller assembly 104 (as well as roller assembly 106) is in the form of a two-wheel bogie truck, with wheels 111 pivotably attached at 113 to threaded stud 115 which is provided with a threaded collar 117. Collar 117 has a larger diameter shoulder flange free to rotate on the inner turbine shell 70, the collar being held in place by a "C" ring. By rotating the threaded collar 117, the stud 115 advances and hence the wheels 111 may engage the lands. Reverse rotation of the collar 117 retracts the wheel assemblies 104. Wheel assemblies 106 are substantially similar to wheel assemblies 104, differing only in the size and number of wheels to accommodate their share of the load of the inner shell 72 during assembly and disassembly.

Figure 9:
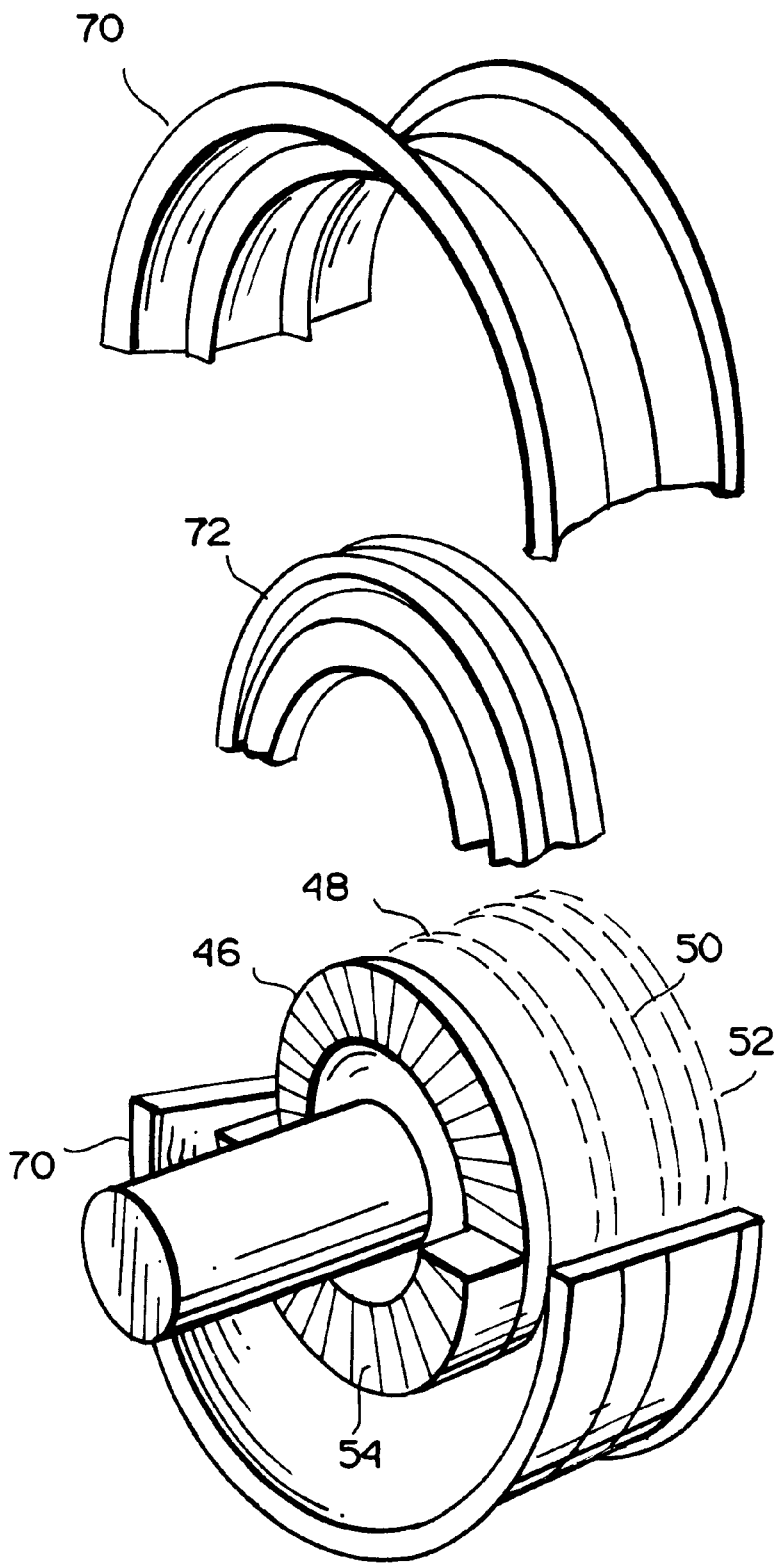
FIGS. 9 and 10 are schematic illustrations of a manner of accessing the lower inner shell section.

Prior to removing the outer upper shell half, the adjusting screws 95 are backed off flats 89 and the top hats 94 are removed by withdrawing them through their access openings in the outer shell, leaving the inner shell supported solely by the rollers inserted into the lower outer shell half as previously described. Also, the cooling pipe fittings 57 and thermal medium inlet and outlet connections 84 and 86, respectively, and their associated adapter fittings 61, are disconnected through the access openings in the outer shell 70. It will be appreciated that when the adapter fittings are removed, the cooling pipe flanges 59 and the inlet extension to plenum 78 and the outlet from plenum 80 are spaced radially inwardly of the outer shell to afford clearances therebetween enabling removal of the lower inner shell half as described below. As noted previously, the upper outer shell half may be removed from the turbine by unbolting the axially opposite end flanges from the remainder of the turbine housing and unbolting the upper outer shell half from the lower outer shell half along a horizontal joint therebetween. By lifting the upper outer shell half from the turbine, the third and fourth stage nozzles 58 and 60, respectively, are likewise removed from the turbine with the upper outer shell half. The removal of the upper outer shell half also provides access for removal of the inner shell halves with the first and second stage nozzles and shrouds carried thereby and affords access to the turbine buckets and other hot gas path parts for their removal and replacement as necessary. This is schematically illustrated in FIG. 9, where the upper outer shell half 70 and the upper inner shell half 72 have been removed.

Figure 10:
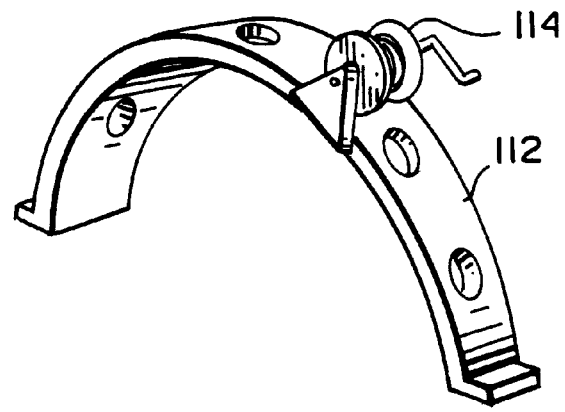
Figure 10:
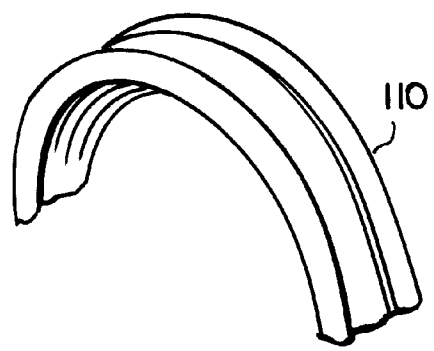
Figure 10:
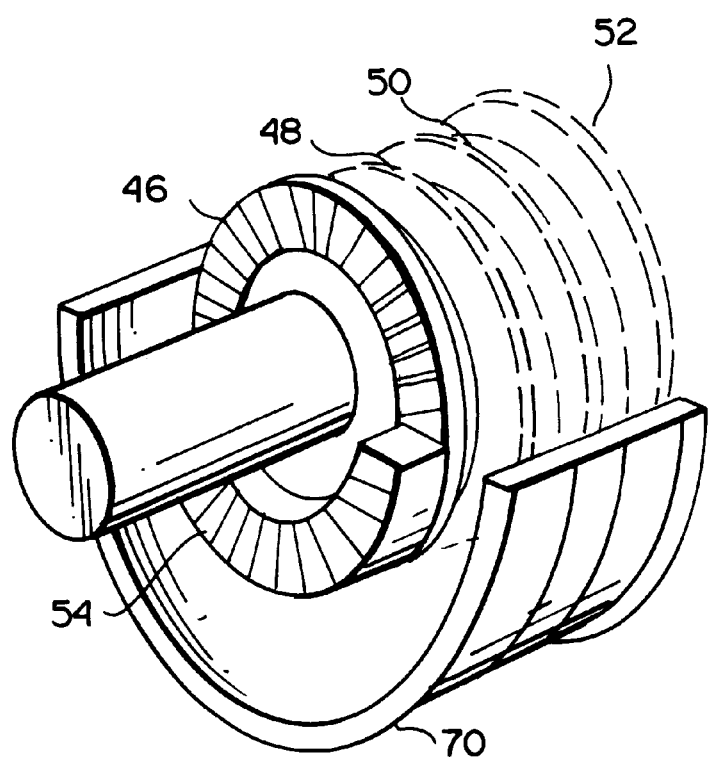
Figure 11:
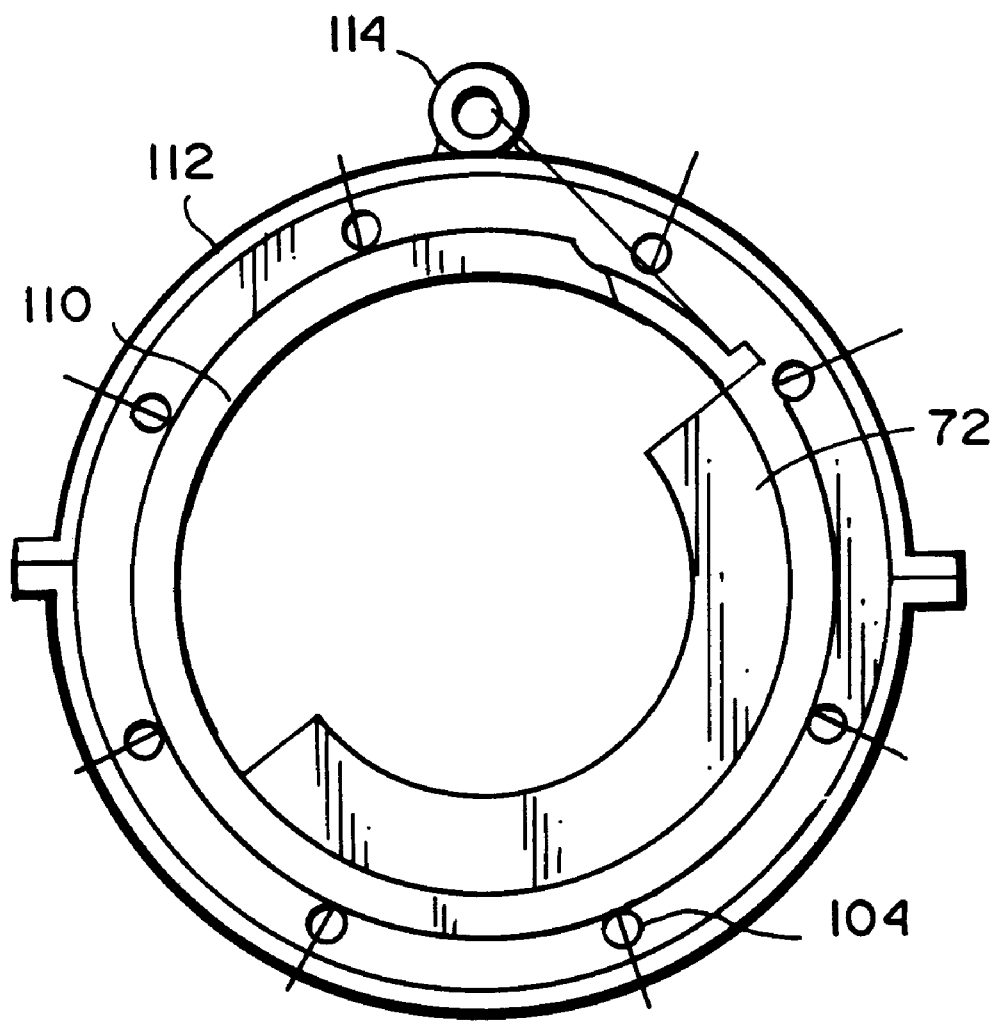
FIG. 11 is a schematic view along a radial plane illustrating a manner of rotating the lower inner shell for subsequent removal.

With both the upper, outer and inner shell halves removed, a simulated or dummy inner shell half 110 (FIG. 10) is secured to the lower inner shell half. The dummy or simulated shell half is of a similar weight as the inner shell half. A rolling fixture 112 may be secured to the turbine housing, i.e., the lower outer shell half, surrounding the dummy inner turbine shell 110. A winch 114 may be provided on the rolling fixture and a line attached to the lower inner shell half. By operation of the winch, the lower inner shell half and the dummy inner shell half may be rotated about the rotor axis for exposure of the lower inner shell half in the access opening. Other suitable tools may be used to rotate the dummy inner shell half and the lower inner shell half as a unit to bring the previously lower inner shell half into an upper position in the access opening. Once located in the access opening, the lower inner shell half, together with the first and second stage nozzles and shroud portions carried thereby can be removed through the access opening whereby all of the nozzles and shrouds can be replaced.

The reverse procedure may be used to reassemble the turbines with replaced or refurbished parts. For example, with the dummy shell half 110 in place, a new inner shell half may be disposed in the access opening adjoining the dummy shell. By rotating the new inner shell half and the dummy shell, the new inner shell half may be located in the lower half of the turbine housing. A second new inner shell half may then be disposed in the access opening and secured to the lower inner shell half. The upper outer shell half is then replaced, closing the turbine. The top hats 94 are then inserted and the adjusting screws adjusted to initially align the inner shell about the rotor axis with minimum tip clearance. The pipe fittings 57 and the inlet and outlet connections for the thermal medium are then reconnected through the access openings in the outer shell and the roller assemblies are removed. The turbine is now in running condition.

Figure 14:
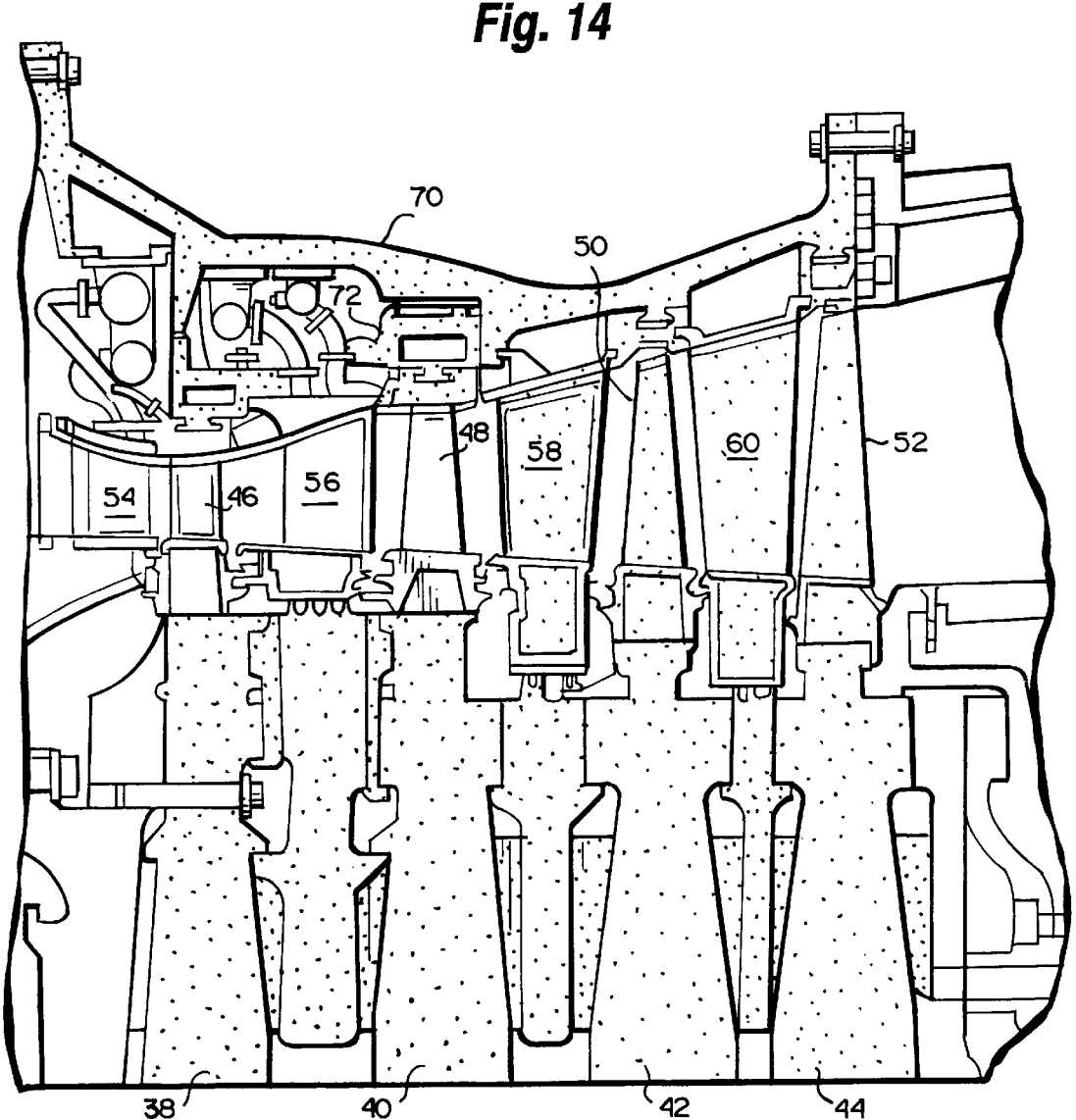
FIG. 14 is a view similar to FIG. 3 illustrating the commonality of turbine components for both air and steam cooling, as well as the components changed upon conversion between air and steam cooling.

Referring to FIG. 14, the turbine hereof is illustrated with parts stippled and parts left clear. The stippled parts of FIG. 14 represent those components of the turbine rotor which are common to the turbine when using either air or steam cooling. The clear parts of FIG. 14 represent those components of the turbine rotor which must be replaced when the rotor is converted between air and steam cooling, the steam cooling components being illustrated. For example, a customer may require initially an air-cooled four stage turbine and later require conversion from the air-cooled turbine to a steam-cooled turbine. Rather than replacing the entire turbine, only the first and second stage buckets 46 and 48, first stage shrouds 74, and first and second stage partitions 54 and 56 of the air-cooled turbine require replacement. By removing the top outer shell 70 and the inner shell halves, as previously described, the inner shell can be refurbished by removing the first stage shrouds and the first and second stage partitions and replacing those elements with the shrouds, partitions and piping necessary for steam cooling. Obviously, an entirely new turbine inner shell could be provided as the replacement part. Additionally, with access to the rotating components, the first and second stage air-cooled turbine buckets can be replaced by first and second stage steam-cooled buckets. The replacement turbine buckets and rotor steam cooling circuit disclosed in those prior applications referenced earlier would complete the conversion. Consequently, common parts used for either air cooled or steam-cooled turbines include the inner and outer shells, the third and fourth stage nozzles, the second stage shrouds, all rotor wheels and spacers and the third and fourth stage turbine buckets.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a turbine having a rotor including axially spaced buckets carried thereby forming parts of turbine stages, an outer containment shell, an inner shell about the rotor including nozzles carried thereby forming other parts of said turbine stages and shrouds about tips of said buckets, respectively, of said stages, and a passage formed in said inner shell for flow of a thermal medium to control thermal movement of said inner shell, comprising the steps of:

forming portions of said passage at least partially circumferentially about the inner shell at each axial location of the buckets of the stages, respectively;

providing a passageway connecting the passage portions of said stages;

disposing radially extending pins between said inner shell and said outer shell to preclude radial and circumferential movement of said inner shell relative to said outer shell;

flowing the thermal medium through said passage portions and said passageway to control the temperature and thermal radial expansion and contraction of said inner shell; and sliding one of said inner shell and said outer shell relative to said pins in response to thermal expansion and contraction of said inner shell relative to said outer shell thereby to control the clearance between the bucket tips and the shroud.

2. A method according to claim 1 including operating the turbine in a steady-state condition, and controlling the temperature of the thermal medium during the steady-state operating condition to control the clearance between the bucket tips and the shroud.

3. A method according to claim 1 wherein one of said turbine stages comprises the first stage of the turbine, and including providing a source for the thermal medium independent of said turbine operation for controlling the temperature of the thermal medium.

4. A method according to claim 3 including providing a closed circuit between the source and the passage for supplying the thermal medium.

5. A method according to claim 1 including, during shutdown of the turbine, maintaining the temperature of the thermal medium to preclude a rate of contraction of the inner shell less than the rate of contraction of the rotor and buckets to avoid contact between the turbine tips and the shroud.

6. A method according to claim 1 including, during turbine start-up, controlling the temperature of the thermal medium to thermally expand the inner shell at a rate at least equal to or greater than the thermal expansion rate of the rotor and buckets to prevent contact between the turbine tips and the shroud.

7. A method according to claim 1 including flowing the thermal medium in series through one of said passage portions, said passageway and another of said passage portions.

8. A method according to claim 1 including flowing air through said passage portions and said passageway as said cooling medium.

9. A method according to claim 1 including providing an inlet in communication with said passage and connected between said inner and outer shells for receiving the thermal medium from a source external to said turbine, and providing an outlet in communication with said passage and connected between said inner and outer shells for exhausting the thermal medium from the turbine.

10. A method according to claim 9 including providing said inlet in direct communication with one of said passage portions and flowing said thermal medium from said one passage portion through said passageway to another of said passage portions.

11. A method of operating a turbine having a rotor including axially spaced buckets carried thereby forming parts of turbine stages, an outer containment shell having upper and lower halves, an inner shell having upper and lower halves about the rotor including nozzles carried thereby forming other parts of said turbine stages and shrouds about tips of said buckets, respectively, of said stages, comprising the steps of:

forming discrete passage portions in each of the upper and lower halves of the inner shell extending circumferentially thereabout at each axial location of the buckets of the stages, respectively, for flowing a thermal medium to control thermal movement of said inner shell;

connecting said inner shell halves to one another and said outer shell halves to one another;

connecting said inner shell and said outer shell to one another to preclude radial and circumferential movement of said inner shell relative to said outer shell and enable thermal radial expansion and contraction of said inner shell relative to said outer shell; and flowing the thermal medium to said passage portions in each of said upper and lower inner shell halves to control the temperature and thermal radial expansion and contraction of said inner shell thereby to control the clearance between the bucket tips and the shrouds.

12. A method according to claim 11 including providing a generally axially extending passageway in each of said upper and lower inner shell halves connecting the passage portions of said stages and flowing the thermal medium in each of the upper and lower inner shell halves serially through a passage portion of one stage, the axial passageway and the passage portion of another of said stages.

\* \* \* \* \*